(12) United States Patent
Cai et al.

(10) Patent No.: US 8,572,616 B2
(45) Date of Patent: Oct. 29, 2013

(54) APPARATUS, SYSTEM, AND METHOD FOR MANAGING Z/OS BATCH JOBS WITH PREREQUISITES

(75) Inventors: Jin Song Cai, Beijing (CN); Pedro Sanchez Vera, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1627 days.

(21) Appl. No.: 11/420,410

(22) Filed: May 25, 2006

(65) Prior Publication Data

US 2007/0277174 A1    Nov. 29, 2007

(51) Int. Cl.
*G06F 9/46*    (2006.01)

(52) U.S. Cl.
USPC ......................................................... 718/101

(58) Field of Classification Search
USPC .................................................. 718/101, 106
See application file for complete search history.

(56) References Cited

U.S. PATENT DOCUMENTS

| | | | | |
|---|---|---|---|---|
| 5,179,702 A | 1/1993 | Spix et al. | | 395/650 |
| 5,634,120 A | 5/1997 | Nagasuka et al. | | 364/608 |
| 5,826,078 A * | 10/1998 | Funaki | | 718/100 |
| 5,872,970 A | 2/1999 | Pickett et al. | | 395/671 |
| 6,041,425 A | 3/2000 | Kokunishi et al. | | 714/37 |
| 6,195,676 B1 | 2/2001 | Spix et al. | | 709/107 |
| 6,289,368 B1 * | 9/2001 | Dentler et al. | | 718/101 |
| 6,501,485 B1 * | 12/2002 | Dash et al. | | 715/700 |
| 7,058,666 B1 * | 6/2006 | Li et al. | | 1/1 |
| 7,466,710 B1 * | 12/2008 | Clemm et al. | | 370/401 |
| 2002/0069239 A1 | 6/2002 | Katada et al. | | 709/202 |
| 2004/0025163 A1 * | 2/2004 | Babutzka et al. | | 718/106 |
| 2004/0223176 A1 * | 11/2004 | Ueda | | 358/1.13 |
| 2005/0144189 A1 | 6/2005 | Edwards et al. | | 707/102 |
| 2006/0017975 A1 * | 1/2006 | Ly et al. | | 358/1.18 |
| 2008/0172579 A1 * | 7/2008 | Hahm et al. | | 714/37 |

OTHER PUBLICATIONS

"Interactive System Productivity Facility". National Finance Center. Title VI, Chapter 2, Section 2. Sep. 2003.*

* cited by examiner

*Primary Examiner* — Jennifer To
*Assistant Examiner* — Brian Chew
(74) *Attorney, Agent, or Firm* — Kunzler Law Group, PC

(57) ABSTRACT

An apparatus, system, and method are disclosed for managing computer jobs with prerequisite jobs in a main frame computing system. A determination module is included that determines a job grouping of jobs for processing by a computer with a mainframe operating system. A grouping module is included to generate generating a job grouping structure associated with the job grouping. The job grouping structure comprises one or more prerequisite jobs and a dependent job that depends on successful completion of each prerequisite job associated with the dependent job. A management module is included to submit the jobs in the job grouping structure to the computer for processing. The jobs are submitted such that each prerequisite job of the dependent job successfully completes prior to submission of the dependent job.

13 Claims, 7 Drawing Sheets

---

```
                          Display
                           110
CMD                    CCB – Monitor Program Status
Command ===>_____

Supported:   E – EditJCL   R – Rerun group   S – Select

S    JobName     Status        Message
____ --jobs--    09/17 13:09   Main Jobs
____ IEBGENR     Complete
____ COPY1       Complete
____ COPY2       Error         Non zero completion code
____ DEFRAG1     Submitted     Job J0028668 submitted
____ COPY3       Not run       Pre-req job failed – COPY2
____ DBRC2       Waiting
*********************************Bottom of data*********************************
```

```
          Display
           110
CMD       M52.CCB.STAT0001          Columns 00001 00072
Command ===>                              Scroll ===> CSR
**************************** Top of Data ****************************
=Note= List each job to be submitted.  On each line, the leftmost name is
=Note= the job to submit.  Other names on the same line are pre-req
=Note= jobs that must finish before this job is submitted.  For example,
=Note= if the line contains job5 job3 job2 then job5 will not be submitted
=Note= until job3 and job2 finish successfully
000001 IEBGENR
000002 COPY1      IEBGENR
000003 COPY2
000004 DEFRAG1    COPY1
000005 COPY3      COPY2
000006 DBRC2      DEFRAG1
*******************************Bottom of data*******************************
```

FIG. 6C

```
                        Display
                         110
CMD                    CCB – Monitor Program Status
Command ===>

Supported:    E – EditJCL    R – Rerun group    S – Select

S      JobName      Status         Message
       --jobs--     09/17 13:09    Main Jobs
       IEBGENR      Submitted      Job J0028656
       COPY1        Waiting
       COPY2        Submitted      Job J0028657
       DEFRAG1      Waiting
       COPY3        Waiting
       DBRC2        Waiting
*******************************Bottom of data*******************************
```

FIG. 6D

```
                              Display
                                110
┌─────────────────────────────────────────────────────────────────┐
│ CMD                         CCB – Monitor Program Status        │
│ Command ===>_____   │
│                                                                 │
│ Supported:   E – EditJCL  R – Rerun group    S – Select         │
│                                                                 │
│ S      JobName      Status        Message                       │
│ _____  --jobs--     09/17 13:09   Main Jobs                     │
│ _____  IEBGENR      Complete                                    │
│ _____  COPY1        Complete                                    │
│ _____  COPY2        Error         Non zero completion code      │
│ _____  DEFRAG1      Submitted     Job J0028668 submitted        │
│ _____  COPY3        Not run       Pre-req job failed – COPY2    │
│ _____  DBRC2        Waiting                                     │
│ ********************************Bottom of data***************** │
└─────────────────────────────────────────────────────────────────┘
```

FIG. 6E

```
                              Display
                                110
┌─────────────────────────────────────────────────────────────────┐
│ CMD                         CCB – Monitor Program Status        │
│ Command ===>_____   │
│                                                                 │
│ Supported:   E – EditJCL  R – Rerun group    S – Select         │
│                                                                 │
│ S      JobName      Status        Message                       │
│ _____  --jobs--     09/17 13:09   Main Jobs                     │
│ _____  IEBGENR      Complete                                    │
│ _____  COPY1        Complete                                    │
│ _____  COPY2        Error         Non zero completion code      │
│ _____  DEFRAG1      Complete                                    │
│ _____  COPY3        Not run       Pre-req job failed – COPY2    │
│ _____  DBRC2        Complete                                    │
│ ********************************Bottom of data***************** │
└─────────────────────────────────────────────────────────────────┘
```

FIG. 6F

APPARATUS, SYSTEM, AND METHOD FOR MANAGING Z/OS BATCH JOBS WITH PREREQUISITES

BACKGROUND OF THE INVENTION

1. Field of the Invention

This invention relates to managing computer jobs and more particularly relates to managing computer jobs with prerequisite jobs.

2. Description of the Related Art

Many computers such as mainframe computers have the ability to run jobs submitted by a user or automatically. Submitting a job in such a fashion may be termed submitting a batch job. A computer job may include execution of lines of computer code in a file to perform one or more tasks such as updating accounts, executing functions, retrieving data, storing data and the like. Jobs may be submitted one at a time or a group of jobs may be submitted.

One job may depend on another job having been successfully completed prior to submission. For example, a first job may execute a function to create a numerical value associated with a variable. A second job may require the numerical value assigned to the variable as input and may fail or have an inaccurate output without successful completion of the first job. A job that depends on completion of another job may be termed a dependent job and the job that must be successfully completed may be termed a prerequisite job. A mainframe computer operating the z/OS® operating system is an example of a computer that may execute batch jobs and that may have prerequisite and dependent jobs. Jobs may be submitted using the job control language ("JCL") or an equivalent batch job submission program.

Submitting jobs one at a time is one way to ensure that a dependent job that has one or more prerequisite jobs is not submitted until the prerequisite jobs have successfully completed. This process is problematic, however, since a user must continually monitor execution of the submitted jobs to determine when a prerequisite job is completed to be able to then submit jobs dependent on completion of the prerequisite jobs. In addition, a user must continually track the dependencies of the jobs.

Submitting a group of jobs in a batch process has the advantage that many jobs can be submitted at one time. Submitting a group of jobs, which may be called a job grouping, is problematic, however, because the user cannot guarantee that prerequisite jobs of the job grouping will be successfully completed before dependent jobs. For example, if a prerequisite job fails, a dependent job may also fail. In a multitasking environment, submitting a job grouping may not guarantee that the jobs listed in the job grouping will be executed in the order the jobs are listed. If the jobs are processed in parallel, a prerequisite job may not be completed before submission of a dependent job.

From the foregoing discussion, it should be apparent that a need exists for an apparatus, system, and method that manage jobs with one or more prerequisite jobs. Beneficially, such an apparatus, system, and method would allow creation of a task list with job groupings, would allow creation of a job grouping that lists dependent jobs and associated prerequisite jobs, would submit a dependent job after successful completion of all prerequisite jobs of the dependent job, and would allow monitoring of the execution of jobs in a job grouping.

SUMMARY OF THE INVENTION

The present invention has been developed in response to the present state of the art, and in particular, in response to the problems and needs in the art that have not yet been fully solved by currently available for managing jobs for a mainframe computing system with prerequisites. Accordingly, the present invention has been developed to provide an apparatus, system, and method for managing computer jobs with prerequisite jobs in a main frame computing system that overcome many or all of the above-discussed shortcomings in the art.

The apparatus to manage computer jobs with prerequisite jobs in a main frame computing system is provided with a plurality of modules configured to functionally execute the necessary steps of creating a task list, a job grouping with jobs in a structure indicating prerequisite jobs, and managing the jobs to submit dependent jobs only after prerequisite jobs of the dependent jobs are completed. These modules in the described embodiments include a determination module that determines a job grouping of jobs for processing by a computer with a mainframe operating system. A grouping module is included to generate a job grouping structure associated with the job grouping. The job grouping structure comprises one or more prerequisite jobs and a dependent job that depends on successful completion of each prerequisite job associated with the dependent job. A management module is included to submit the jobs in the job grouping structure to the computer for processing. The jobs are submitted such that each prerequisite job of the dependent job successfully completes prior to submission of the dependent job.

In one embodiment, the mainframe operating system comprises a z/OS operating system. In another embodiment, the job grouping structure includes a composite job, where the composite job is both a dependent job for one or more prerequisite jobs and a prerequisite job for at least one dependent job and the management module submits the jobs such that each prerequisite job of the composite job successfully completes prior to submission of the composite job and the composite job successfully completes prior to submission of the at least one dependent job for which the composite job is a prerequisite job. In another embodiment, a task list module is included to generate a task list, where the task list comprises one or more job groupings.

The apparatus, in one embodiment, is configured to include a status module that generates a status structure indicating a status of processing of each job in the job grouping structure. In another embodiment, the status module periodically updates the status structure. A monitor module is included, in another embodiment, to read the status structure and to display the status of each job in the job grouping structure in response to user input. The monitor module includes, in one embodiment, an edit module that edits a job in the job grouping structure. In another embodiment, a job status module is included to display a job output. A rerun module is included, in another embodiment, to rerun failed prerequisite jobs and dependent jobs associated with one or more failed prerequisite jobs.

The monitor module, in one embodiment, reads the status structure and displays the status of each job in the job grouping structure in response to user input and the status structure having an age less than a status age maximum. In another embodiment, the monitor module reads the status structure of a plurality of job grouping structures within a task list and displays the status of each job in each of the read job grouping structures in response to user input. In yet another embodiment, the monitor module reads the status structure of a plurality of job grouping structures within a plurality of task lists and displays the status of each job in each of the read job grouping structures in response to user input.

A system of the present invention is also presented to manage computer jobs with prerequisite jobs in a main frame computing system. The system may be embodied by a computer with a mainframe operating system, a user interface connected to the computer, a display connected to the user interface, a processor in the computer, and a memory in the computer. In particular, the memory, in one embodiment, includes a task list module that generates a task list where the task list comprises one or more job groupings. The memory includes a grouping module that generates a job grouping file associated with a job grouping in the task list. The job grouping file comprises one or more prerequisite jobs and a dependent job that depends on successful completion of each prerequisite job associated with the dependent job and the jobs are for processing by a computer with a mainframe operating system. The memory includes a management module that submits the jobs in the job grouping file to the computer for processing. The jobs are submitted such that each prerequisite job of the dependent job successfully completes prior to submission of the dependent job.

In one embodiment, the user interface is a computing device connected to the computer through a computer network and the computing device comprises any of a terminal, a desktop computer, a laptop computer, a tablet computer, and a workstation. In another embodiment, the user interface supports an Interactive System Productivity Facility ("ISPF") editor. In another embodiment, the mainframe operating system comprises a z/OS operating system. The memory may further include a status module configured to generate a status file indicating a status of processing of each job in the job grouping file. In another embodiment, the memory includes a monitor module that reads the status file and displays a status of each job in the job grouping file in response to user input.

A method of the present invention is also presented for managing computer jobs with prerequisite jobs in a main frame computing system. The method in the disclosed embodiments substantially includes the steps necessary to carry out the functions presented above with respect to the operation of the described apparatus and system. In one embodiment, the method includes obtaining a job management tool that manages dependent jobs with prerequisite jobs. The job management tool includes determining a job grouping of jobs for processing by a computer with a mainframe operating system, deploying the job management tool, and maintaining the job management tool. The job management tool includes generating a job grouping structure associated with the job grouping. The job grouping structure comprises one or more prerequisite jobs and a dependent job that depends on successful completion of each prerequisite job associated with the dependent job. The job management tool includes submitting the jobs in the job grouping structure to the computer for processing. The jobs are submitted such that each prerequisite job of the dependent job successfully completes prior to submission of the dependent job.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 6C is an example of a display for editing a job grouping structure in accordance with the present invention; and FIGS. 6D-6F are examples of a monitoring display for various points in time while processing a job grouping in accordance with the present invention.

DETAILED DESCRIPTION OF THE INVENTION

Figure 1:
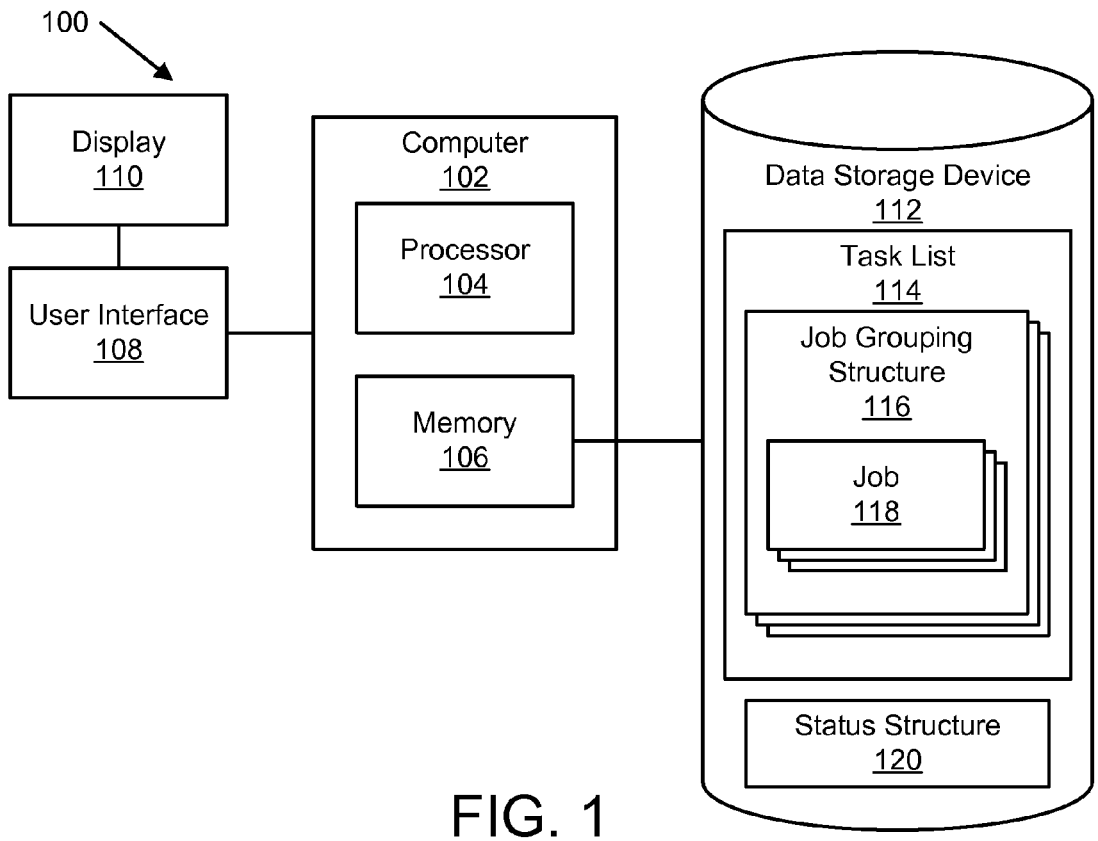
FIG. 1 is a schematic block diagram illustrating one embodiment of a system to manage computer jobs with prerequisite jobs in a main frame computing system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

A storage device may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 is a schematic block diagram illustrating one embodiment of a system 100 to manage computer jobs with prerequisite jobs in a main frame computing system in accordance with the present invention. The system 100 includes a computer 102 with a processor 104 and memory 106, a user interface 108, a display 110, and a data storage device 112. The data storage device 112 includes a task list 114. The task list 114 includes one or more job groupings related to job grouping structures 116. Each job grouping structure 116 includes a plurality of jobs 118. The data storage device 112 may also include a status structure 120. The components and data structures of the system 100 are described below.

The computer 102 typically includes a mainframe operating system. The mainframe operating system, in one embodiment, is a z/OS operating system. The mainframe operating system may also be MVS, OS/390®, or the like. The computer 102 is typically a mainframe computer, but may also be a personal computer, laptop computer, workstation, etc. with a mainframe operating system or a mainframe operating system emulator. The computer 102 includes a processor 104. The processor 104 may be a single processor, multiple processors, a chipset with a processor, or any other configuration of electronic parts and components comprising a processor 104 that may process lines of computer code. The computer 102 includes a memory 106. The memory 106 may be random access memory ("RAM"), a hard disk drive, or other memory 106 capable of storing data.

The system 100 includes a user interface 108 connected to a display 110 and to the computer 102. The user interface 108 may be a terminal, a personal computer, a laptop computer, a tablet computer, a personal digital assistant ("PDA") or similar computing device capable of providing a way for a user to input data to the computer 102. In one embodiment, the user interface 108 is a keyboard connected to the computer 102. In another embodiment, the user interface 108 supports the Interactive System Productivity Facility ("ISPF") tool. The user interface 108 may be connected to the computer 102 by direct wiring or through a computer network such as the Internet, a local area network ("LAN"), a wide area network ("WAN"), a wireless network, a storage area network ("SAN"), or any other connection capable of transmitting data from the user interface 108 to the computer 102.

The system 100 includes a display 110 connected to the user interface 108. The display 110 may be a computer monitor, a liquid crystal display ("LCD") monitor, and the like. The display 110, in one embodiment, may be connected to the computer 102. The display 110 may be any device capable of displaying data on a screen, paper, or other media.

The system 100, in one embodiment, includes a data storage device 112 configured to store a task list 114 and a status structure 120 and connected to the computer 102. The data storage device 112 may be part of the computer 102 or may be external to the computer 102. The data storage device 112 may be connected to the computer 102 over a computer network such as a LAN, WAN, SAN, etc. The data storage device 112 may be connected to the computer 102 over a communication bus such as a Small Computer Systems Interface ("SCSI"), Advanced Technology Attachment ("ATA"), or other appropriate communication bus. The data storage device 112 may comprise a hard disk drive, tape storage, an optical drive, flash memory, and the like.

In one embodiment, the data storage device 112 includes a task list 114. The task list 114 comprises a list of one or more job groupings. In another embodiment, the task list 114 is included in the memory 106. Each job grouping in the task list 114 is associated with a corresponding job grouping structure 116 that may be included in the data storage device 112. In another embodiment, the corresponding job grouping structure 116 may be in the memory 106.

Each job grouping structure 116 includes at least one job 118. Jobs 118 may be independent or may have prerequisite dependencies. A job 118 may depend on another job 118 being successfully completed prior to submission for execution. Such a job may be termed a dependent job. A job 118 that must successfully complete before another dependent job 118 may be termed a prerequisite job. A job 118 may also be a dependent job and a prerequisite job and may be termed a composite job. For example, a job grouping structure 116 may include job 1, job2 and job3. Job2 may require job 1 to be successfully completed before job 2 is submitted for processing. Job3 may require both job1 and job2 to be successfully completed prior to being submitted. Job2 is a composite job because job2 is a dependent job which depends on successful completion of job 1 and is a prerequisite job to job3. In another embodiment, the data storage device 112 includes a status structure 120. The status structure 120 may also be located in the memory 106. The status structure 120 will be more fully described in relation to FIG. 3.

Figure 2:
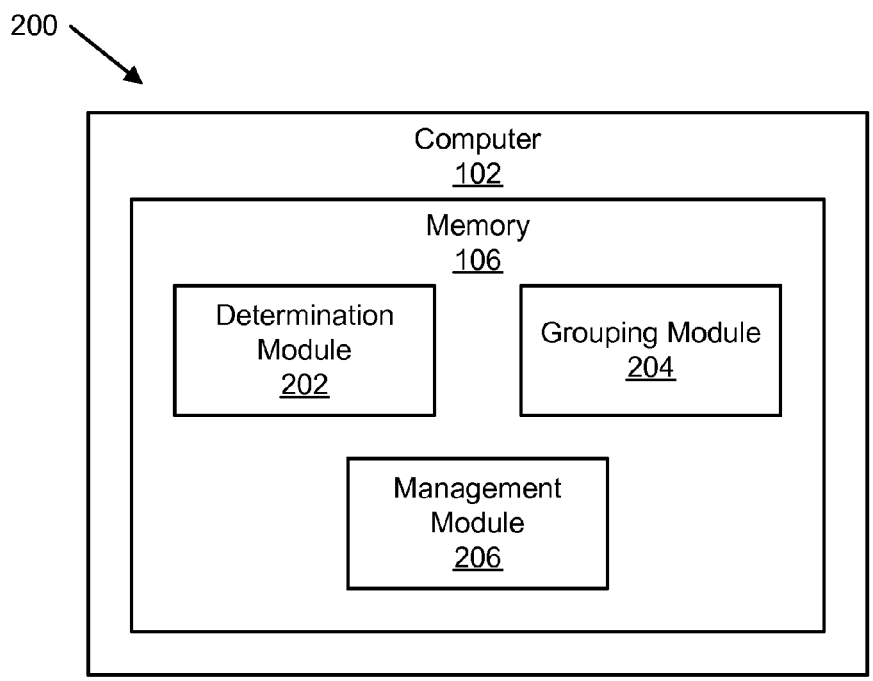
FIG. 2 is a schematic block diagram illustrating one embodiment of an apparatus to manage computer jobs with prerequisite jobs in a main frame computing system in accordance with the present invention.

FIG. 2 is a schematic block diagram illustrating one embodiment of an apparatus 200 to manage computer jobs with prerequisite jobs in a main frame computing system in accordance with the present invention. The apparatus 200 includes a computer 102 and a memory 106 substantially similar to those described in relation to FIG. 1. The memory 106, in one embodiment, includes a determination module 202, a grouping module 204, and a management module 206, which are described below.

The memory 106, in one embodiment, includes a determination module 202 that determines a job grouping of jobs 118 for processing by a computer 102 with a mainframe operating system. The determination module 202, in one embodiment, determines which jobs 118 are to be submitted as a job grouping. In another embodiment, the determination module 202 determines dependent relationships between jobs 118.

The memory 106 includes a grouping module 204 that generates a job grouping structure 116 associated with a job grouping. The grouping module 204 generates a job grouping structure 116 that includes one or more prerequisite jobs and a dependent job that depends on successful completion of each prerequisite job associated with the dependent job. In one embodiment, the grouping module 204 places jobs 118 in order of intended submission and indicates dependent relationships between jobs 118. For example, three jobs 118, job1, job2, and job3, may be part of a job grouping and job1 must be successfully completed prior to submission of job2 and job2 must be successfully completed before submission of job3. The grouping module 204 may create a job dependency where job1 is a prerequisite job for job2 and job2 is a prerequisite job for job3. One way of creating such a structure is to order the jobs 118 in the job grouping structure 116 as follows:

job1
    job2 job1
    job 3 job2

The grouping module 204 places in the job grouping structure 116 jobs 118 to be submitted each on a separate line and corresponding prerequisite jobs on the same line after the job 118 to be submitted. In another embodiment, the grouping structure 116 may be a matrix. In yet another embodiment, the job grouping structure 116 is a database. One of skill in the art will recognize other structures that may define a dependent relationship between jobs 118.

The memory 106 includes a management module 206 that submits the jobs 118 in the job grouping structure 116 to the computer 102, typically to the processor 104, for processing. The jobs 118 are submitted such that each prerequisite job of a dependent job successfully completes prior to submission of the dependent job. In one embodiment, the management module 206 first submits jobs 118 that have no prerequisites.

The management module 206 then submits a dependent job after the prerequisite jobs associated with the dependent job are successfully completed. The management module 206 typically will not submit a dependent job if a prerequisite job associated with the dependent job fails.

The apparatus 200 is advantageous because it provides a way to manage jobs 118 submitted for processing by a computer 102 such that prerequisite jobs are processed prior to submission of the dependent jobs associated with the prerequisite jobs. The apparatus 200 overcomes the problems of the prior art so that a user submitting batch jobs 118 does not have to submit prerequisite jobs first and monitor processing and ensure completion before submitting dependent jobs. In addition, the apparatus 200 overcomes the problems of the prior in that a user submitting batch jobs in an intended order does not have the problem of jobs being processed out of order. For example, the apparatus 200 overcomes the problem of dependent jobs being submitted prior to completion of prerequisite jobs.

Figure 3:
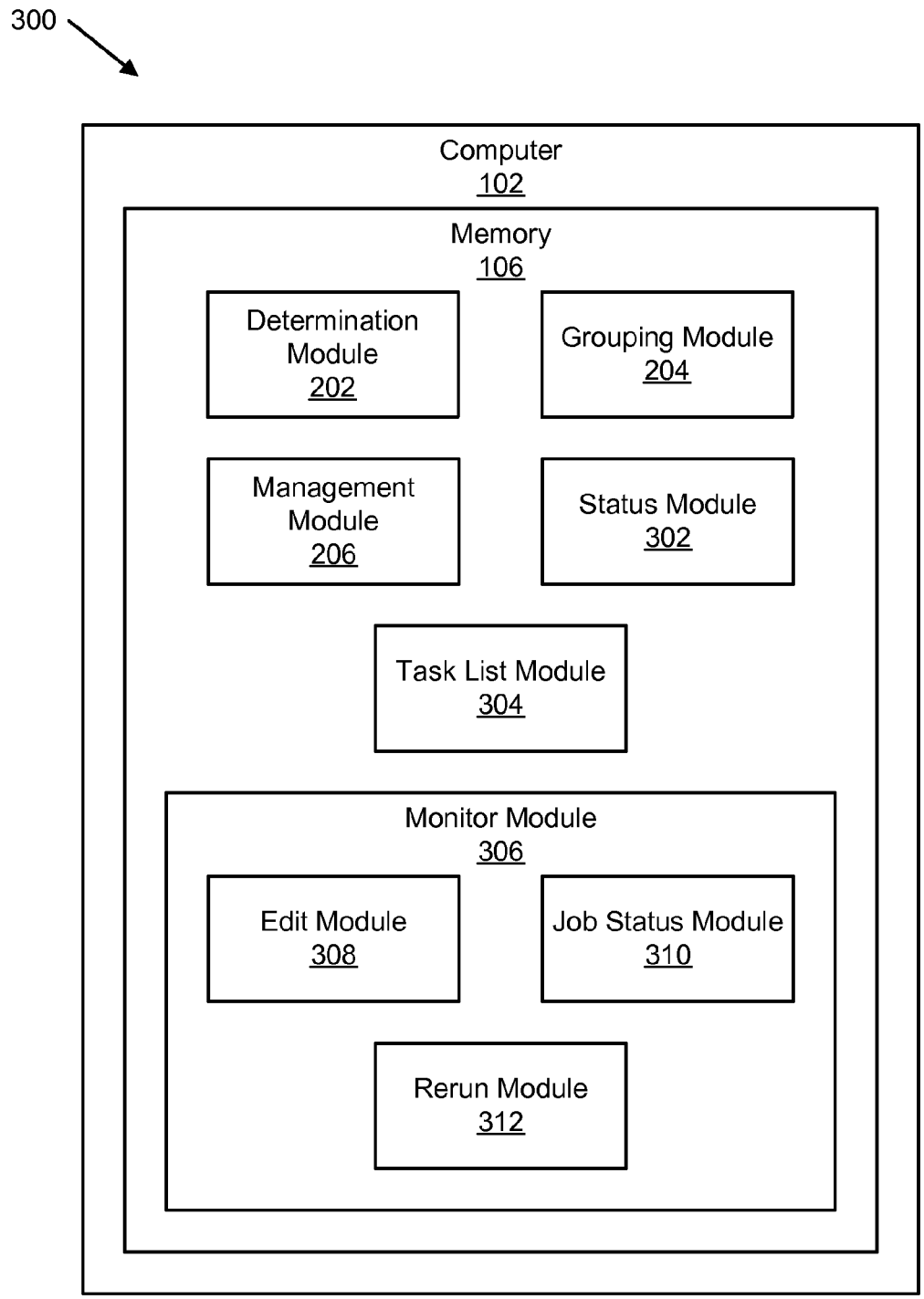
FIG. 3 is a schematic block diagram illustrating another embodiment of an apparatus to manage computer jobs with prerequisite jobs in a main frame computing system in accordance with the present invention.

FIG. 3 is a schematic block diagram illustrating another embodiment of an apparatus 300 to manage computer jobs with prerequisite jobs in a main frame computing system in accordance with the present invention. The apparatus 300 includes a computer 102 with a memory 106 substantially similar to those described in relation to FIG. 1. The memory 106 includes a determination module 202, a grouping module 204, and a management module 206 substantially similar to the modules described in relation to FIG. 2. The memory 106, in one embodiment, includes a status module 302, a task list module 304, and a monitor module 306 that includes an edit module 308, a job status module 310, and a rerun module 312, which are described below.

The memory 106 includes a status module 302 that generates a status structure 120 indicating a status of processing of each job 118 in the job grouping structure 116. The status structure 120 may be, for example, a file, a table, a matrix, a data structure, a database, and the like. The status structure 120, where a status for each job 118 may be placed, may be located in memory 106, in the data storage device 112, may include part of the status structure 120 in one location and part in another, etc. One of skill in the art will recognize other locations where a status structure 120 may reside.

The status module 302, in one embodiment, generates a status periodically. The time period between the times when the status module 302 generates and stores a status may be any convenient time period that will suit a user, will not slow processing, etc. The status module 302, in another embodiment, generates a status for one or more jobs 118 at one time and generates a status for one or more other jobs 118 at another time. The status module 302, in yet another embodiment, is event driven and updates the status for a job 118 when an event occurs, such as when the job 118 starts, fails or is complete.

The status module 302, in one embodiment, generates a status for a job 118 of "submitted," "running," "waiting," "complete," "error," or "not run." In another embodiment, other words, numbers, word/number combinations, computer code, etc. are used to indicate status. In another embodiment, the status module 302 includes a message with a status. For example, when the status module 302 determines that a job 118 has been submitted, the status module 302 may include a status of "submitted" and may also include a message such as "Job J0028656 submitted," where the number in the message may be a job number assigned by the computer 102. A message that is included with an "error" status may be "Non-zero completion code." A message that is included with a "not run" status may be "pre-req job failed—jobx" where jobx is a prerequisite job that must be completed before the job 118 associated with the "not run" status is displayed. More than one prerequisite job 118 that has not run or has failed may be displayed. One of skill in the art will recognize other ways that the status module 302 may generate and store a status for each job 118 in a job grouping.

The memory 106, in one embodiment, includes a task list module 304 that generates a task list 114. A task list 114 comprises one or more job groupings. For example, a user may enter an "edit" command on a command line and the task list module 304 may generate a task list 114 based on user input. A user may provide user input to the task list module 304 by typing job groupings on a keyboard. In one embodiment, a task list 114 is a file containing a list of job groupings and each job grouping may be associated with a job grouping structure 116. In another embodiment, a task list 114 is part of data structure and the job groupings in the task list 114 are linked to corresponding job grouping structures 116. One of skill in the art will recognize other ways for the task list module 304 to generate a task list 114 and link job groupings in the task list 114 to job grouping structures 116.

The memory 106, in one embodiment, includes a monitor module 306 that reads the status structure 120 and displays the status of each job 118 in the job grouping structure 116 in response to user input. In one embodiment, user input involves pressing a key or number of keys on a keyboard, such as pressing the "enter" key at the user interface 108. In another embodiment, user input include selecting an icon on the display 110 using a mouse that is part of the user interface 108. In one embodiment, the monitor module 306 displays the status for each job 118 by reading the status structure 120 and updating the status of each job 118 with each user input. In another embodiment, a user launches the monitor module 306 and the monitor module 306 updates the status of each job 118 each time the status module 302 generates or updates a status structure 120. The monitor module 306 may display the status of each job 118 on the display 110 or may generate a file that may be viewed, emailed, printed, etc.

In one embodiment, the monitor module 306 displays only a portion of the jobs 118 in a job grouping structure 116. In another embodiment, the monitor module 306 reads multiple status structures 120 and displays the status of jobs 118 in the job grouping structures 116 associated with the status structures 120. In another embodiment, the monitor module 306 reads status structures 120 from multiple task lists 114 and displays the status of the corresponding jobs 118. In yet another embodiment, the monitor module 306 reads status structures 120 and displays the status of each job 118 in the job grouping structure 116 for status structures 120 having an age less than a status age maximum. One of skill in the art will recognize other ways for the monitor module 306 to read one or more status structures 120 and to display the status of jobs 118 in one or more job grouping structures 116 in one or more task lists 114.

The monitor module 306, in another embodiment, includes an edit module 308 that edits a job 118 in the job grouping structure 116. The edit module 308, in one embodiment, allows a user to select a job 118 to edit from the user interface 108 and allows the user to edit the job 118 using the user interface 108 and display 110. In one embodiment, a user may select a job 118 to edit by entering an "e" to the left of the job 118 that is displayed by the monitor module 306. For example, the edit module 308 may allow a user to edit a job 118 that has failed to change an error in the job 118, or to change a parameter in the job 118 for the next time the job 118 is run. One of skill in the art will recognize other ways for the edit module 308 to edit a job 118.

In one embodiment, the monitor module 306 includes a job status module 310 that displays a job output. For example, if the monitor module 306 displays an error status for a job 118, the job status module 310 may display the job output for the failed job 118 to allow a user to diagnose a problem with the job 118. The user may use the job output to help edit the job 118 using the edit module 308. In one embodiment, the job status module 310 displays a job output in response to user input. The user input may comprise typing an "s" after a cursor is placed to the left of a job 118 displayed on the display 110 by the monitor module 306. One of skill in the art will recognize other ways that the job status module 310 may display a job output.

In another embodiment, the monitor module 306 includes a rerun module 312 that reruns failed prerequisite jobs and dependent jobs associated with one or more failed prerequisite jobs. For example, after editing a job 118 using the edit module 308, the rerun module 312 may rerun failed prerequisite jobs. Once the failed prerequisite jobs successfully complete, the rerun module 312 submits dependent jobs associated with the successfully completed prerequisite jobs. The failed prerequisite jobs may also be composite jobs. In one embodiment, the rerun module 312 reruns jobs 118 based on user input. For example, a user may type an "r" in the command line of a display created by the monitor module 306. In another example, a user may type an "r" next to a job 118 to be rerun so that only that job is rerun. One of skill in the art will recognize other ways that the rerun module 312 may rerun failed jobs 118 or jobs 118 not yet submitted.

Figure 4:
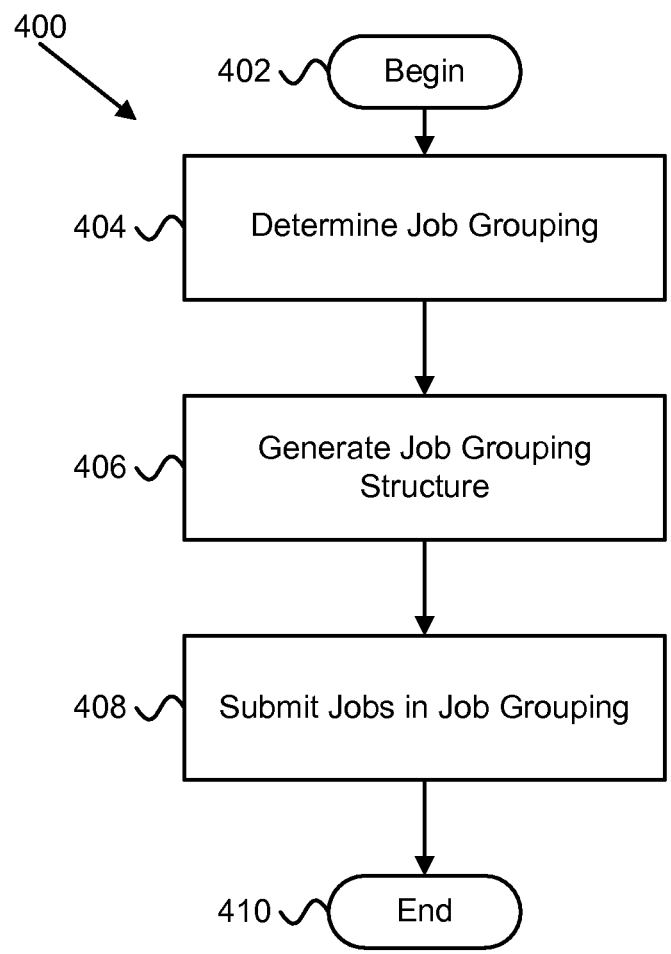
FIG. 4 is a schematic flow chart diagram illustrating one embodiment of a method for managing computer jobs with prerequisite jobs in a main frame computing system in accordance with the present invention.

FIG. 4 is a schematic flow chart diagram illustrating one embodiment of a method 400 for managing computer jobs with prerequisite jobs in a main frame computing system in accordance with the present invention. The method 400 begins 402 and the determination module 202 determines 404 a job grouping of jobs 118 for processing by the computer 102. The grouping module 204 generates 406 a job grouping structure 116 associated with the job grouping. The job grouping structure 116 comprises one or more prerequisite jobs and at least one dependent job that depends on successful completion of each prerequisite job associated with the dependent job. The management module 206 submits 408 the jobs 118 in the job grouping structure 116 to the computer 102 for processing and the method 400 ends 410. The management module 206 submits 408 the jobs 118 such that each prerequisite job of the dependent job successfully completes prior to submission of the dependent job.

Figure 5:
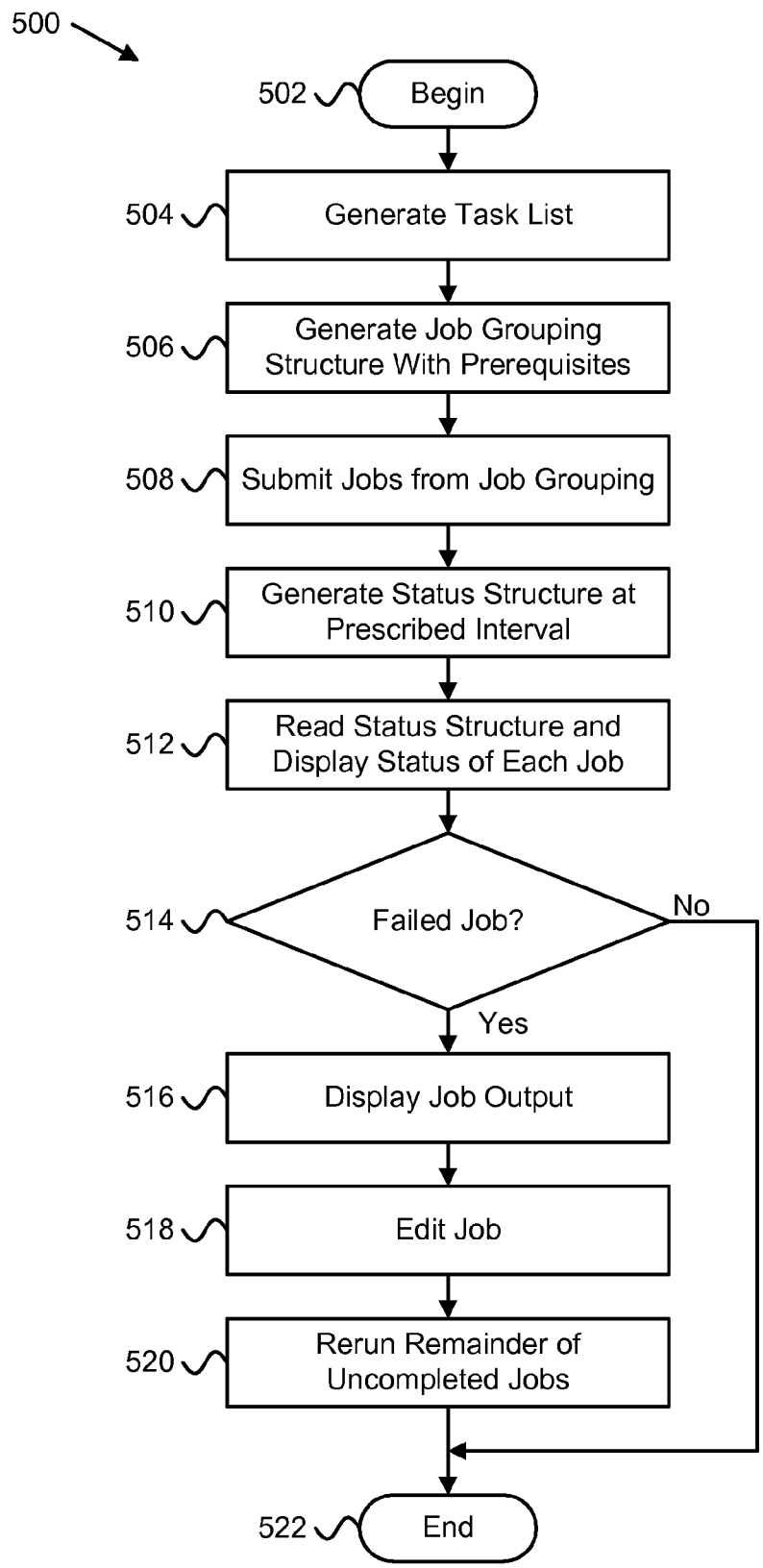
FIG. 5 is a schematic flow chart diagram illustrating another embodiment of a method for managing computer jobs with prerequisite jobs in a main frame computing system in accordance with the present invention.

FIG. 5 is a schematic flow chart diagram illustrating another embodiment of a method 500 for managing computer jobs with prerequisite jobs in a main frame computing system in accordance with the present invention. The method 500 begins 502 and the task list module 304 generates 504 a task list 114 with one or more job groupings. In one embodiment, a user types "edit" on the command line of the user interface 108 and a task list 114 screen appears on the display 110. The user may then enter job groupings at the user interface 108.

The grouping module 204 generates 506 a job grouping structure 116 associated with one of the job groupings in the task list 114. The job grouping structure 116 includes one or more prerequisite jobs and at least one dependent job that depends on successful completion of each prerequisite job associated with the dependent job. The jobs 118 are for processing by the computer 102. In one embodiment, a user types an "e" to the left of a job grouping on the task list screen appearing on the display 110 which opens up a screen that allows a user to type in jobs 118. The jobs 118 may be arranged with both prerequisite jobs and dependent jobs. For each dependent job, applicable prerequisite jobs may be typed to the right of the dependent job.

The management module 206 submits 508 the jobs 118 in the job grouping structure 116 to the computer 102 for processing. The management module 206 submits 508 the jobs 118 such that each prerequisite job of a dependent job successfully completes prior to submission of the dependent job. The status module 302 generates 510 a status structure 120 indicating a status of processing of each job 118 in the job grouping structure 116. In one embodiment, the status module 302 generates or updates the status structure 120 at a fixed time interval.

The monitor module 306 reads 512 one or more the status structures 120 and displays a status of each job 118 in the job grouping structure 116 in response to user input. In one embodiment, the user input is an "enter" provided at the user interface 108. A status of a job 118 may be that of "error" indicating that the computer 102 encountered an error during processing of the job 118 and processing failed. In one embodiment, the monitor module 306 determines 514 if a job 118 has failed and if so, displays an error status. If the monitor module 306 determines 514 that a job 118 has failed, the job status module 310 displays 516 the job output from the failed job 118. For example, the user may position a cursor to the left of the failed job 118 and type an "s." The job status module 310 then displays 516 the job output of the failed job to facilitate debugging and analysis of the failed job 118.

The edit module 308 edits 518 the failed job 118. In one embodiment, the user positions the cursor to the left of the failed job 118 on the display generated by the monitor module 306 and types an "e." The edit module 308 opens the job 118 for editing from the user interface 108. The rerun module 312 reruns 520 failed prerequisite jobs and dependent jobs associated with one or more failed prerequisite jobs and the method 500 ends 522. In one example, a user types an "r" and the rerun module 312 reruns 520 the jobs 118. In another embodiment, the monitor module 306 determines 514 that there are no failed jobs t118 and the method 500 ends 522. The method 500 provides one embodiment of managing jobs 118 with prerequisites, but it is understood that a user has flexibility in monitoring, displaying a job output, editing, and rerunning jobs 118.

Figure 6A:
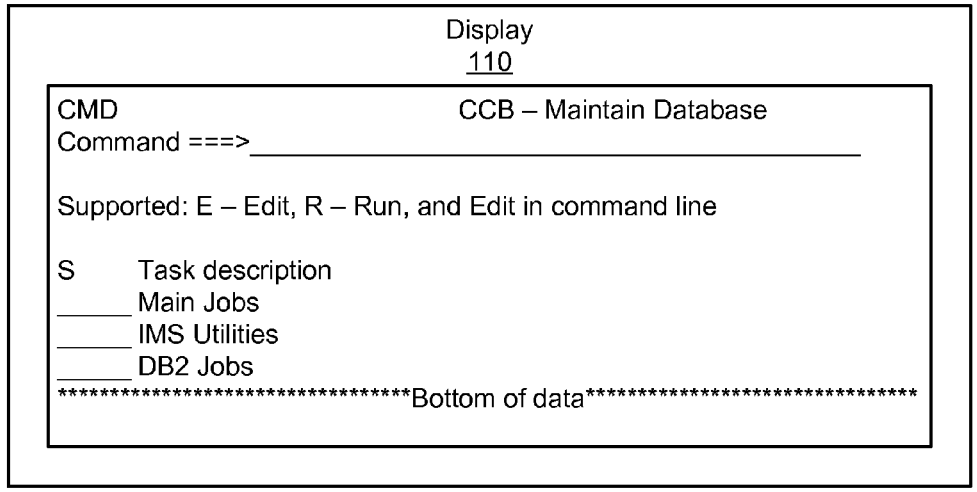
FIG. 6A is an example of a display of a task list in accordance with the present invention.
Figure 6B:
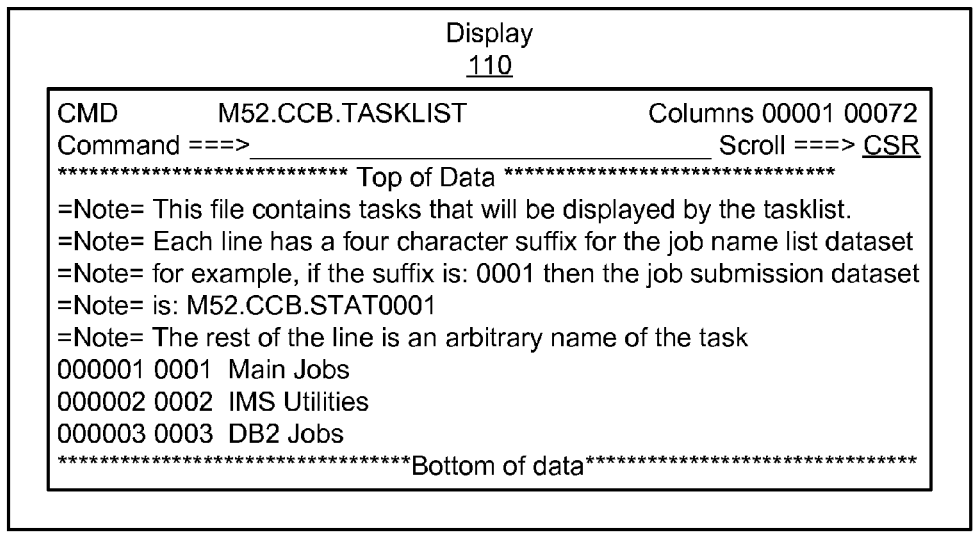
FIG. 6B is an example of a display for editing a task list in accordance with the present invention.

FIGS. 6A to 6F depict possible screen displays from one embodiment of the present invention. FIG. 6A is an example of a display of a task list 114. The task list 114 includes three job groupings: Main Jobs, IMS Utilities, and DB2 Jobs. A user may type "edit" in the command line to edit the task list 114 and the task list module 304 opens an editor screen for the task list 114. FIG. 6B is an example of a display of a screen for editing a task list 114. The screen may be displayed by the task list module 304 in response to a user typing "edit" at the command line. The user may edit the task list 114 by adding, modifying, or deleting job groupings. A user may use the ISPF editor to edit job groupings in the task list 114. In the depicted embodiment, a user adds a suffix that is a four digit number as the job grouping along with an arbitrary name for the job grouping. For example, one job grouping listed is 0002 with an arbitrary name of "IMS Utilities."

FIG. 6C is an example of a display for editing a job grouping structure 116. For example, if the user enters an "e" to the left of a job grouping, the grouping module 204 opens a job grouping structure 116 corresponding to the job grouping. FIG. 6C depicts a possible display corresponding to opening the 0001 job grouping (named "Main Jobs"). Notes can be added to the job grouping structure 116 as depicted. In the particular example, IEBGENR is a job 118 without any prerequisite jobs. COPY1 is a composite job being both a dependent job with a prerequisite job IEBGENR and a prerequisite job for DEFRAG1. COPY2 is a job 118 without any prerequisites. DEFRAG1 is a composite job that is a prerequisite job for DBRC2 and is a dependent job with COPY1 as a prerequisite. COPY3 is a dependent job with a prerequisite of COPY2. DBRC2 is a dependent job with a prerequisite of DEFRAG1. The grouping module 204 may allow editing using the ISPF editor.

FIG. 6D is an example of a monitoring display for one point in time while processing a job grouping. FIG. 6D depicts processing of the "Main Jobs" job grouping structure 116 at one point in time as displayed by the monitor module 306 on the display 110. At the particular point in time, the IEBGENR and COPY2 jobs 118 are submitted. A "submitted" status is shown for the jobs 118 being processed and a message indicates a process number assigned to the jobs 118. The COPY1, DEFRAG1, COPY3, and DBRC2 jobs 118 are waiting because the prerequisite jobs IEBGENR and COPY2 have not yet been successfully completed. A "waiting" status is displayed for the jobs 118 not yet submitted.

FIG. 6E is an example of a monitoring display for a second point in time while processing the Main Jobs job grouping structure 116 as displayed by the monitor module 306 on the display 110. The IEBGENR and COPY1 jobs 118 are complete and the COPY2 job 118 has failed. An error status is displayed with a message. The display 110 indicates a "submitted" status for DEFRAG1 along with an assigned process number. The display 110 indicates that COPY3 has a "not run" status because COPY2 has failed. The display 110 indicated that DGRC2 has a status of "waiting" because DEFRAG1 is not yet successfully completed.

FIG. 6F is an example of a monitoring display for a third point in time while processing the Main Jobs job grouping structure 116 as displayed by the monitor module 306 on the display 110. FIG. 6F differs from FIG. 6E only in that DEFRAG1 and DBRC2 both have a status of complete. A user may enter an "s" next to the COPY2 job 118 and the job status module 310 will display the COPY2 job output. The user may also enter an "e" next to the COPY2 job 118 and the edit module 308 will allow the user to edit COPY2. The user may then rerun COPY2 and COPY3 by typing an r.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a non-transitory storage device storing executable code executed by a processor that manages computer jobs with prerequisite jobs in a main frame computing system by:

determining a job grouping of jobs for processing by a computer with a mainframe operating system;

generating a job grouping structure associated with the job grouping, wherein the job grouping structure comprises one or more prerequisite jobs, and a composite job, wherein the composite job depends upon successful completion of each prerequisite job associated with the composite job and is a prerequisite job for at least one dependent job generating a status structure at a prescribed time interval, the status structure indicating a status of each job in the job grouping structure;

submitting for processing the jobs in the job grouping structure, wherein the jobs are submitted such that each prerequisite job associated with the composite job successfully completes prior to submission of the composite job and the composite job successfully completes prior to submission of the at least one dependent job for which the composite job is a prerequisite job;

reading the status structure;

displaying a task list of the jobs;

editing prerequisite and composite jobs for a first job with an Interactive System Productivity Facility (ISPF) Editor;

displaying a status line of each job in the job grouping structure in response to a user input and if the status structure for the job has a status structure age less than a status age maximum, each status line comprising a status, a job name, a message, and a command line, the status consisting of submitted, running, waiting, complete, error and not run statuses, wherein the submitted status indicates a job number is assigned, the not run status indicates that a prerequisite job failed, and the error status indicates a non-zero completion code;

editing job control language of the first job in response to the first job failing; and rerunning the edited first job and jobs depending on the completion of the first job in response to a command in the command line.

2. The computer program product of claim 1, wherein the mainframe operating system comprises a z/OS operating system.

3. The computer program product of claim 1, wherein generating a status structure further comprises periodically updating the status structure.

4. The computer program product of claim 1, further comprising displaying the status of each job in the job grouping structure having the status structure age less than the status age maximum in response to user input.

5. The computer program product of claim 4, further comprising displaying a first job output.

6. The computer program product of claim 4, further comprising generating the task list, wherein the task list comprises one or more job groupings.

7. The computer program product of claim 6, further comprising reading status structures of a plurality of job grouping structures within the task list and displaying the status of each job in the plurality of job grouping structures having the status structure age less than the status age maximum in response to user input.

8. The computer program product of claim 6, further comprising reading status structures of a plurality of job grouping structures within the task list and displaying the status of each job in the plurality of job grouping structures in response to user input.

9. A system to manage computer jobs with prerequisite jobs in a main frame computing system, the system comprising:

a computer with a mainframe operating system;

a user interface connected to the computer;

a display connected to the user interface;

a processor in the computer; and a memory in the computer, the memory comprising a task list module generating a task list, wherein the task list comprises one or more job groupings;

a grouping module generating a job grouping file associated with a job grouping in the task list, wherein the job grouping file comprises one or more prerequisite jobs, and a composite job, wherein the composite job depends upon successful completion of each prerequisite job associated with the composite job and is a prerequisite job for at least one dependent job and the jobs are for processing by a computer with a mainframe operating system, and generating a status structure at a prescribed time interval, the status structure indicating a status of each job in the job grouping structure; and a management module submitting the jobs in the job grouping file to the computer for processing, wherein the jobs are submitted such that each prerequisite job associated with the composite job successfully completes prior to submission of the composite job and the composite job successfully completes prior to submission of the at least one dependent job for which the composite job is a prerequisite job, the management module further reading the status structure, displaying a task list of the jobs, editing prerequisite and composite jobs for a first job with an Interactive System Productivity Facility (ISPF) Editor, displaying a line status of each job in the job grouping structure in response to a user input and if the status structure for the job has a status structure age less than a status age maximum, each status line comprising a status, a job name, a message, and a command line, the status consisting of submitted, running, waiting, complete, error and not run statuses, wherein the submitted status indicates a job number is assigned, the not run status indicates that a prerequisite job failed, and the error status indicates a non-zero completion code, editing job control language of the first job in response to the first job failing, and rerunning the edited first job and jobs depending on the completion of the first job in response to a command in the command line.

10. The system of claim 9, wherein the user interface is a computing device connected to the computer through a computer network, wherein the computing device comprises any of a terminal, a desktop computer, a laptop computer, a tablet computer, and a workstation.

11. The system of claim 9, wherein the user interface supports the ISPF editor.

12. The system of claim 9, wherein the mainframe operating system comprises a z/OS operating system.

13. A method for managing computer jobs with prerequisite jobs in a main frame computing system, the method comprising:

obtaining a job management tool that manages dependent jobs with prerequisite jobs, the job management tool comprising determining a job grouping of jobs for processing by a computer with a mainframe operating system;

generating a job grouping structure associated with the job grouping, wherein the job grouping structure comprises one or more prerequisite jobs, and a composite job, wherein the composite job depends upon successful completion of each prerequisite job associated with the composite job and is a prerequisite job for at least one dependent job;

generating a status structure at a prescribed time interval, the status structure indicating a status of each job in the job grouping structure;

submitting for processing the jobs in the job grouping structure to the computer, wherein the jobs are submitted such that each prerequisite job associated with the composite job successfully completes prior to submission of the composite job and the composite job successfully completes prior to submission of the at least one dependent job for which the composite job is a prerequisite job; reading the status structure;

reading the status structure;

displaying a task list of the jobs; editing prerequisite and composite jobs for a first job with an Interactive System Productivity Facility (ISPF) Editor;

displaying a status line of each job in the job grouping structure in response to a user input and if the status structure for the job has a status structure age less than a status age maximum, each status line comprising a status, a job name, a message, and a command line, the status consisting of submitted, running, waiting, complete, error and not run statuses, wherein the submitted status indicates a job number is assigned, the not run status indicates that a prerequisite job failed, and the error status indicates a non-zero completion code;

editing job control language of the first job in response to the first job failing; and rerunning the edited first job and jobs depending on the completion of the first job in response to a command in the command line.

\* \* \* \* \*